United States Patent
Pham et al.

(10) Patent No.: US 11,878,787 B1
(45) Date of Patent: Jan. 23, 2024

(54) PROPELLER CONTROL MECHANISM

(71) Applicant: Huy Ngoc Pham, Ho Chi Minh (VN)

(72) Inventors: Huy Ngoc Pham, Ho Chi Minh (VN); Thuy An Thi Nguyen, Ho Chi Minh (VN)

(73) Assignee: Huy Ngoc Pham, Ho Chi Minh (VN)

( * ) Notice: Subject to any disclaimer, the term of this patent is extended or adjusted under 35 U.S.C. 154(b) by 0 days.

(21) Appl. No.: 18/462,425

(22) Filed: Sep. 7, 2023

(51) Int. Cl.
*B64C 11/32* (2006.01)

(52) U.S. Cl.
CPC .................................. *B64C 11/32* (2013.01)

(58) Field of Classification Search
CPC ......... B64C 27/32; B64C 27/72; B64C 27/48; B64C 27/10; B64C 27/39; B64C 27/52; B64C 27/54; B64C 27/33; B64C 27/35; B64C 27/43; B64C 27/46; B64C 11/06; B64C 27/022; B64C 27/08; B64C 27/37; B64C 27/58; B64C 27/59; B64C 11/32; B64C 2027/7294; B64C 27/04; B64C 27/12; B64C 27/41; B64U 10/17; B64U 10/10; B64U 30/20; B64U 10/80; F01D 7/00

See application file for complete search history.

(56) References Cited

U.S. PATENT DOCUMENTS

| | | | | |
|---|---|---|---|---|
| 5,628,620 A | * | 5/1997 | Arlton | A63H 27/12 446/40 |
| 5,749,540 A | * | 5/1998 | Arlton | B64C 27/82 244/17.19 |
| 5,879,131 A | * | 3/1999 | Arlton | B64C 27/10 416/223 R |
| 8,197,205 B2 | * | 6/2012 | Rudley | B64C 27/72 416/158 |
| 9,708,058 B2 | * | 7/2017 | Gaffiero | B64C 27/50 |
| 9,914,535 B2 | * | 3/2018 | Paulos | H02P 7/29 |
| 11,541,994 B2 | * | 1/2023 | Clarke | B64C 27/10 |

* cited by examiner

*Primary Examiner* — Eric J Zamora Alvarez

(57) ABSTRACT

The present invention relates to a propeller control mechanism comprising a center, a first group, and a second group. This mechanism is capable of controlling the angle of attack of the propeller blades without auxiliary actuators or external linkages and minimizing the propeller blades' motion range. Furthermore, this mechanism is applicable not only to aerial vehicles but also to vehicles on the surface of water or underwater.

13 Claims, 6 Drawing Sheets

PROPELLER CONTROL MECHANISM

FIELD OF THE INVENTION

The present invention relates to mechanics. More particularly, the present invention relates to a propeller control mechanism for achieving attitude control in vehicles in the air, on the surface of water, or underwater.

BACKGROUND ART

The unmanned aerial vehicle (UAV) was first tested in 1917 and has continuously evolved ever since. Over the past decade, the explosive growth of patent filings related to UAVs worldwide has reflected the remarkable advancements in this field during the digital age. This surge in patent activity serves as a testament to the accelerated pace of innovation, with groundbreaking technologies and capabilities being introduced to enhance UAV performance, control, and applications. As UAVs become increasingly integrated into various industries, such as aerial photography, surveillance, delivery services, and scientific research, their transformative impact on our modern society is becoming more evident.

Continuously refining the control method allows for enhanced maneuverability, stability, and precision in adjusting the propeller's lifting thrust. By optimizing the control mechanism, researchers and engineers strive to achieve greater efficiency, increased payload capacity, extended flight duration, and improved overall vehicle performance. The development of innovative control techniques is key to unlocking the full potential of aerial vehicles and advancing the capabilities of this field.

Four-rotor "quadrotor" flight systems coordinate multiple identical rotors to achieve thrust and moment objectives, enhancing stability, maneuverability, and control. By adjusting rotors' speed, quadrotors enable vertical takeoff, agile maneuvers, and controlled orientation. They are widely used in aerial photography, surveillance, search and rescue, and entertainment, showcasing advancements in aerial vehicle design and control while pushing the boundaries of unmanned flight technology.

Traditional helicopters employ auxiliary servo actuators and a complex swashplate mechanism to actively change the angle of attack of the main propeller on every revolution, a method referred to as "cyclic control." This dynamic control mechanism allows helicopters to adjust the lift distribution and orientation of the rotor blades as they rotate, enabling precise control over the helicopter's movements in different directions. The cyclic control method is crucial in achieving maneuverability, stability, and responsiveness in the aircraft, making it a fundamental component of traditional rotorcraft technology.

In patent application U.S. Pat. No. 9,914,535B2 of author James J. PAULOS, granted on Mar. 13, 2018, the author discloses an air vehicle that utilizes the disclosed technology to maintain lifting thrust by regulating the average rotor speed. Control moments are generated through coordinated pulsing of the motor torque. By rapidly pulsing the motor torque, oscillations in the propeller angle of attack are induced, allowing for "attitude control" without the need for traditional auxiliary actuators and linkages. This innovative MAV propulsion system is capable of utilizing a minimum number of actuators, serving dual roles for both thrust and moment objectives.

It can be seen that the aforementioned technical solutions meet specific purposes and requirements. However, the drawback of these vehicles or solutions is that they use multi-actuator systems or complex mechanisms. Moreover, the operating range of the propeller blades in patent application U.S. Pat. No. 9,914,535B2 is significant because they simultaneously change the fields of flapping, lead-lag, and feathering motion.

Therefore, what is necessary is to have a propeller control mechanism that can flexibly control the angle of attack of the propeller blades while maintaining a fixed angle between the propeller blade's feathering axis and the rotary axis of the propeller. By limiting the range of flapping motion, this mechanism optimizes the operating range of the propeller blades and, subsequently, optimizes the size of the vehicles, especially coaxial rotor vehicles.

Moreover, what is necessary is to have a propeller control mechanism with a similar structure and functionality, which can also be applied to vehicles on the surface of the water and in underwater environments.

The propeller control mechanism disclosed in the present invention solves the above described problems.

SUMMARY OF THE INVENTION

The purpose of the present invention is to provide a propeller control mechanism comprising:
  a center comprises a central axis, which serves as its rotary axis;
  a first group is mechanically connected to the center, comprises a first component of the first group, a second component of the first group, and a third component of the first group;
  the first component of the first group is mechanically connected to the center, able to rotate to the center around a first axis of the first group;
  the second component of the first group is mechanically connected to the first component of the first group, able to rotate to the first component of the first group around a second axis of the first group; and
  one end of the third component of the first group is mechanically connected to the second component of the first group, able to rotate to the second component of the first group around a third axis of the first group; another end of the third component of the first group is mechanically connected to the center, able to rotate to the center around a fourth axis of the first group;
  wherein the first axis of the first group, the second axis of the first group, the third axis of the first group, and the fourth axis of the first group meet at a same point; and
  a second group is mechanically connected to the center, comprises a first component of the second group, a second component of the second group, and a third component of the second group;
  the first component of the second group is mechanically connected to the center, able to rotate to the center around a first axis of the second group;
  the second component of the second group is mechanically connected to the first component of the second group, able to rotate to the first component of the second group around a second axis of the second group; and
  one end of the third component of the second group is mechanically connected to the second component of the second group, able to rotate to the second component of the second group around a third axis of the second group; another end of the third component of the second group is mechanically connected to the center, able to rotate to the center around a fourth axis of the second group;

wherein the first axis of the second group, the second axis of the second group, the third axis of the second group, and the fourth axis of the second group meet at a same point.

BRIEF DESCRIPTION OF THE DRAWINGS

The accompanying drawings, which are incorporated in and form a part of this specification, illustrate embodiments of the invention and, together with the description, serve to explain the principles of the invention.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION OF THE INVENTION

References will now be made in detail to the invention, examples of which are illustrated in the accompanying drawings. The invention is intended to cover alternatives, modifications, and equivalents, which may be included within the spirit and scope of the invention as defined by the appended claims. In the following detailed description of the present invention, numerous specific details are set forth in order to provide a thorough understanding of the present invention. However, it would be obvious to one of the ordinary skills in the art at the time the invention was made. It may be practiced without these specific details. In other instances, well-known methods, procedures, components, and circuits have not been described in detail so as not to unnecessarily obscure aspects of the present invention.

A brief review of some terms used herein. A rotor and a propeller are used synonymously herein. A rotor blade and a propeller bade are used synonymously herein. The terms "angle of attack" and "pitch angle" are not synonymous but are closely related concepts.

Figure 1:
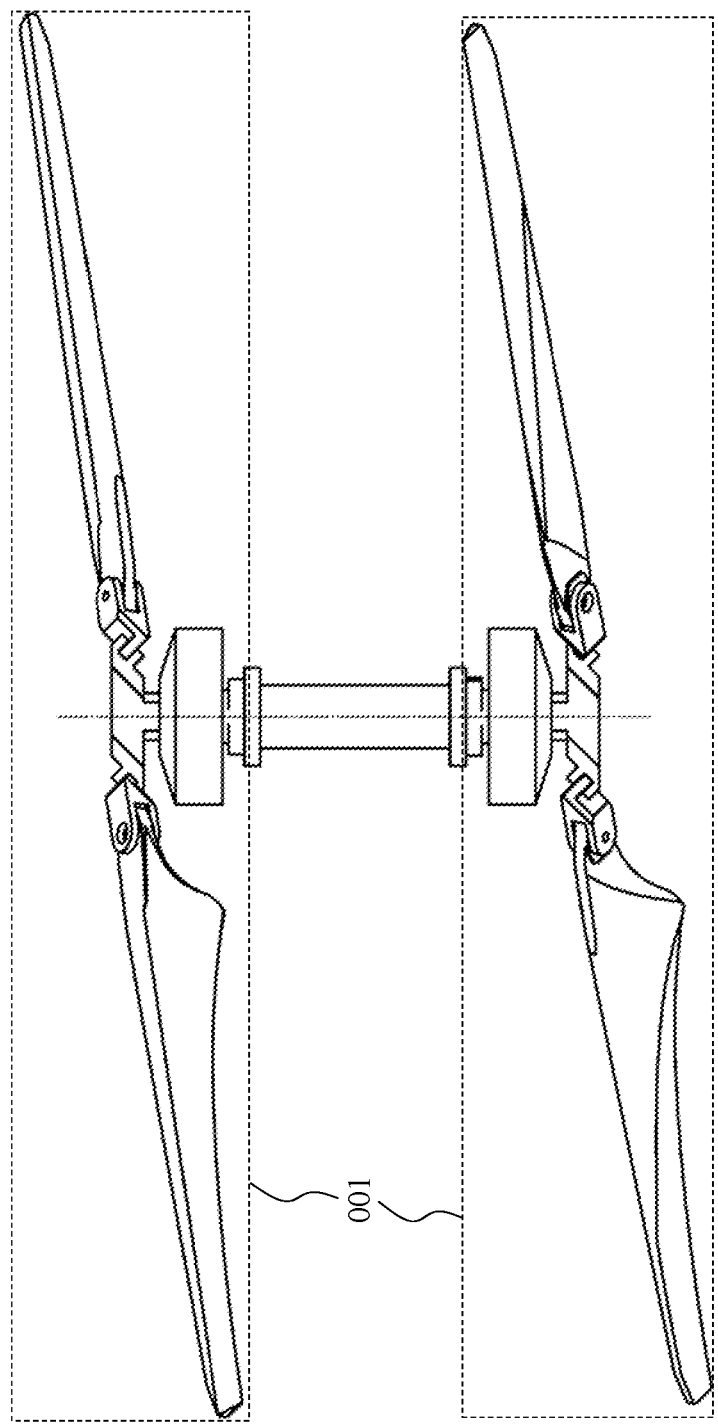
FIG. 1 is an illustration of the range of a passive rotor control mechanism of the prior art.

FIG. 1 illustrates an aerial vehicle of the prior art, which mentioned a rotor control mechanism described as follows: a first propeller blade attached to the hub via a first hinge and a second propeller blade attached to the hub via a second hinge, in which the first hinge and the second hinge are appropriately placed to help generate control moments. The advantage of this structure is its compact design and efficient operation, without the need for traditional swashplate mechanisms or auxiliary actuators and linkages, especially in coaxial rotor vehicles. However, it can be observed that the range of motion of the rotor blades 001, illustrated by the dashed rectangles, is considerable due to the propeller's movements of feathering, flapping, and lead-lag adjustments.

Figure 2:
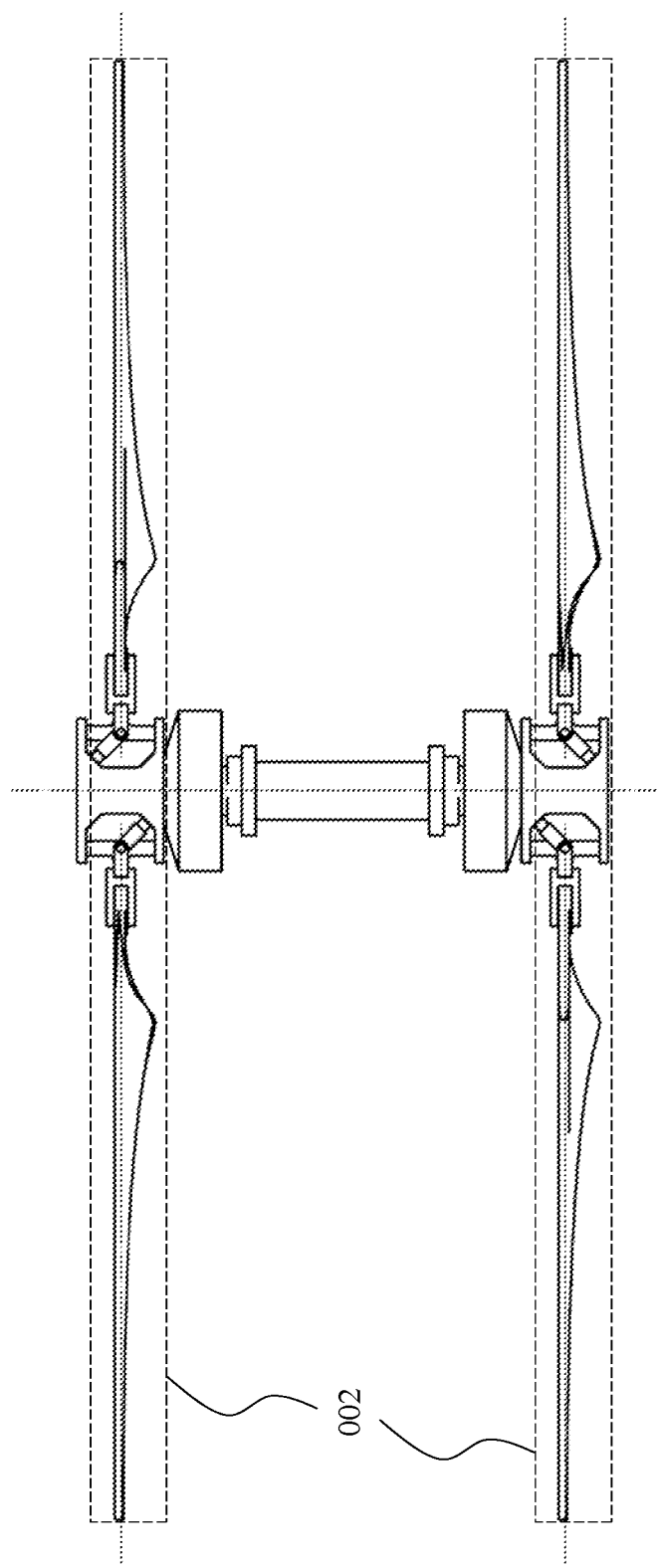
FIG. 2 is an illustration of the range of a propeller control mechanism disclosed in this present invention.

FIG. 2 depicts the propeller control mechanism described in the present invention, in which the angle between the propeller blade's feathering axis and the rotary axis of the propeller is fixed, thereby significantly reducing the range of motion of the propeller blades 002, illustrated by the dashed rectangles.

Figure 3:
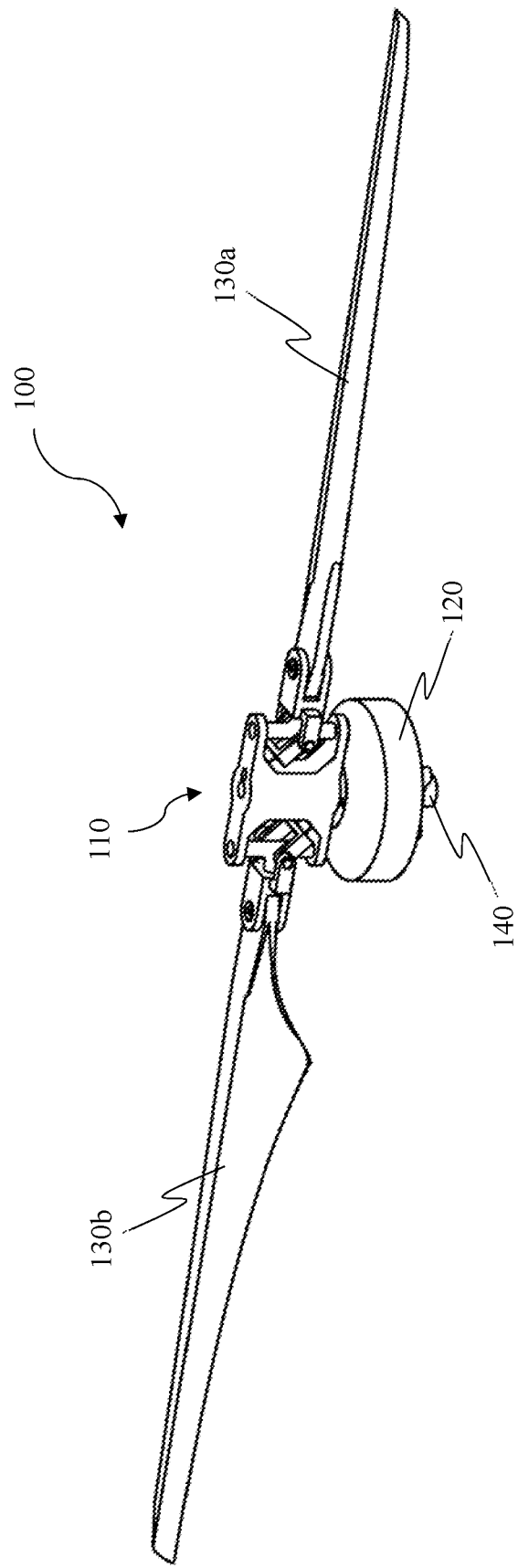
FIG. 3 is an exemplary illustration of a propeller system using the propeller control mechanism.

FIG. 3 is an illustration of the major components of a propeller system 100, comprising a propeller control mechanism 110, a rotor of motor 120, a first propeller blade 130*a*, a second propeller blade 130*b*, and a rotor position sensor 140. The propeller control mechanism 110 is fixedly concentrically connected to the rotor of motor 120; as the rotor of motor 120 rotates, the propeller control mechanism 110 also rotates accordingly. The rotor position sensor 140, which can be a magnetic based sensor, an optical based sensor, or the like, is used to estimate a position of the rotor of motor 120. The first propeller blade 130*a* and the second propeller blade 130*b* are mechanically connected to the propeller control mechanism 110.

Figure 4:
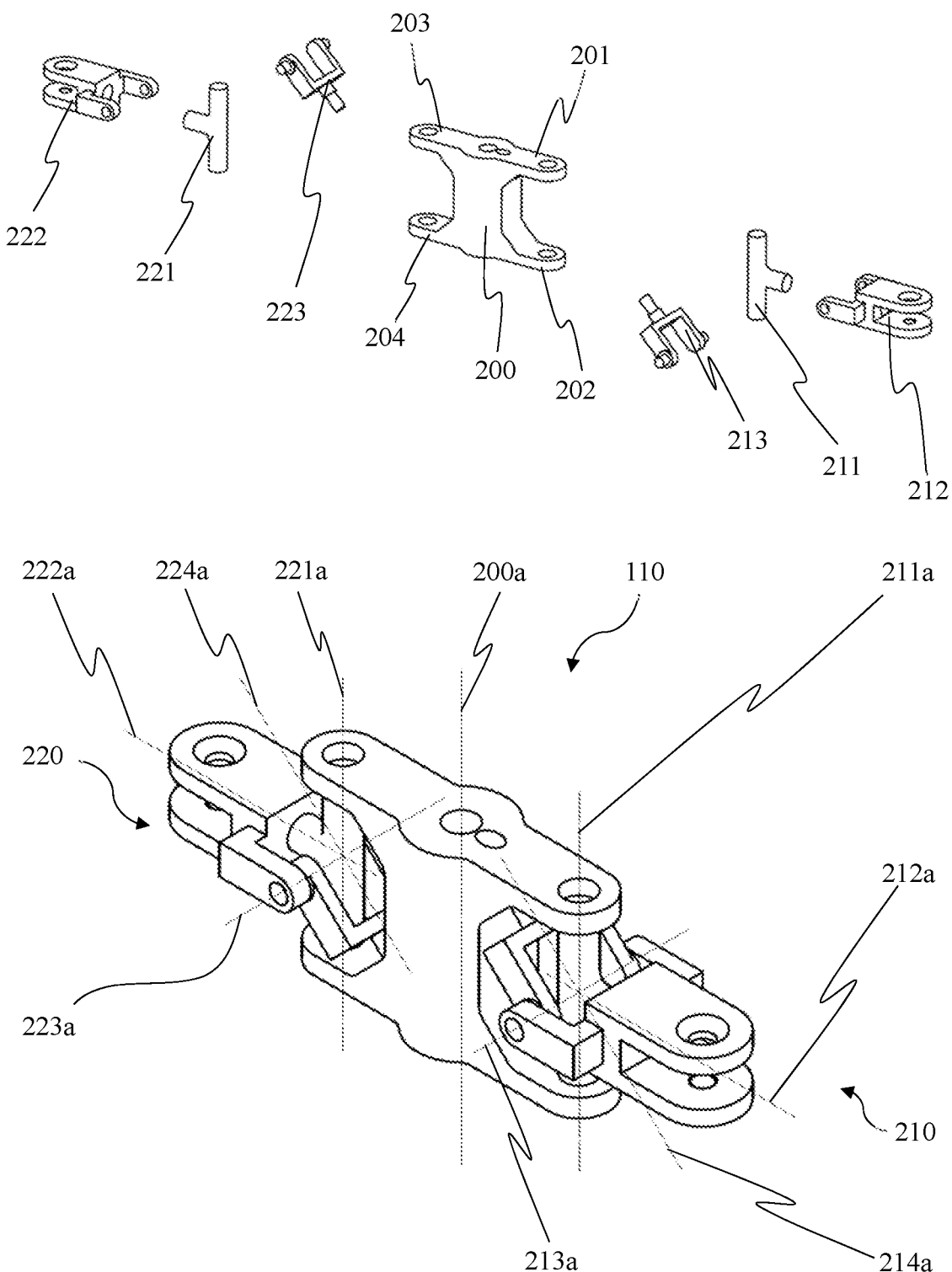
FIG. 4 is an exemplary illustration of the propeller control mechanism.

FIG. 4 illustrates the construction of the propeller control mechanism according to one embodiment of the present invention. The propeller control mechanism 110 comprises a center 200, a first group 210, and a second group 220. The first group 210 and the second group 220 are mechanically connected to the center 200. The center 200 includes a first support bar 201, a second support bar 202, a third support bar 203, and a fourth support bar 204. The first group 210 comprises a first component of the first group 211, a second component of the first group 212, and a third component of the first group 213. The first component of the first group 211 is mechanically connected to the center 200 via a first axis of the first group 211*a*. The second component of the first group 212 is mechanically connected to the first component of the first group 211 via a second axis of the first group 212*a*. The third component of the first group 213 is mechanically connected to the second component of the first group 212 via a third axis of the first group 213*a*. Additionally, the third component of the first group 213 is mechanically connected to the center 200 around a fourth axis of the first group 214*a*.

According to various embodiments of the present invention, the first axis of the first group 211*a*, the second axis of the first group 212*a*, and the third axis of the first group 213*a* are mutually perpendicular to each other.

The second group 220 comprises a first component of the second group 221, a second component of the second group 222, and a third component of the second group 223. The first component of the second group 221 is mechanically connected to the center 200 via a first axis of the second group 221*a*. The second component of the second group 222 is mechanically connected to the first component of the second group 221 via a second axis of the second group 222*a*. The third component of the second group 223 is mechanically connected to the second component of the second group 222 via a third axis of the second group 223*a*. Additionally, the third component of the second group 223 is mechanically connected to the center 200 via a fourth axis of the second group 224*a*.

According to various embodiments of the present invention, the first axis of the second group 221*a*, the second axis of the second group 222*a*, and the third axis of the second group 223*a* are mutually perpendicular to each other.

The center 200 has a central axis 200*a*, which serves as its rotational axis. According to various embodiments of the present invention, each of the first support bar 201, the second support bar 202, the third support bar 203, and the fourth support bar 204 is configured with a hole (not shown) for mechanical connection to the first component of the first group 211 and the first component of the second group 221. In this arrangement, the hole centerlines of the first support bar 201 and the second support bar 202 are collinear with the first axis of the first group 211a, and the hole centerlines of the third support bar 203 and the fourth support bar 204 are collinear with the first axis of the second group 221a.

According to another embodiment of the present invention, each of the first support bar 201, the second support bar 202, the third support bar 203, and the fourth support bar 204 is configured with a joint (not shown), such as a bearing, instead of a hole for mechanical connection with the first component of the first group 211 and the first component of the second group 221.

The center 200 further includes a first inclined hole (not shown) and a second inclined hole (not shown), each located on each side of the central axis 200a. The first inclined hole is configured on one side of the center 200, which is connected to the first group 210. The first inclined hole is positioned higher than the center mass of the center 200 (not shown), with its centerline collinear with the fourth axis of the first group 214a. It is used for mechanical connection to the third component of the first group 213. The second inclined hole is configured on the opposite side of the center 200, which is connected to the second group 220. The second inclined hole is positioned lower than the center mass of the center 200, with its centerline collinear with the fourth axis of the second group 224a. It is used for mechanical connection to the third component of the second group 223. Specifically, the first inclined hole starts from the bottom surface of the first support bar 201 and extends upwards. The second inclined hole starts from the top surface of the fourth support bar 204 and extends downwards.

In embodiments of the invention, the fourth axis of the first group 214a meets the central axis 200a at a first angle (not shown), and the fourth axis of the second group 224a meets the central axis 200a at a second angle (not shown). In which the first and second angles may be the same or not. In embodiments of the invention, the fourth axis of the first group 214a and the fourth axis of the second group 224a are parallel. In an embodiment of the invention, the fourth axis of the first group 214a and the fourth axis of the second group 224a are further coplanar with the central axis 200a.

Continuing with FIG. 4, the first component of the first group 211 comprises two aligned bars and one middle bar that are rigidly connected to form a "T" shape, mechanically connected to the center 200 through a hinge connection with the first support bar 201 and the second support bar 202 around the first axis of the first group 211a. According to various embodiments of the present invention, all three bars have circular cross-sections. Specifically, the two aligned bars of the first component of the first group 211 are connected to the holes in the first support bar 201 and the second support bar 202 but are limited at both ends. As a result, the first component of the first group 211 can rotate around the first axis of the first group 211a inside the holes but cannot translate along the holes.

The second component of the first group 212 comprises a U-shaped bar with two ends oriented towards the center 200, which is rigidly connected to another U-shaped bar with two ends oriented in the opposite direction. These bars are rigidly connected in the shape of a cross, with two branches of one U-shaped bar parallel and spaced 90° apart from two branches of the other. At each end oriented towards the center 200 of the second component of the first group 212, a hole is configured, with its centerline collinear with the third axis of the first group 213a, used for the mechanical connection to the third component of the first group 213. A hole is configured at each end facing away from the center 200 of the second component of the first group 212, used for the mechanical connection to the first propeller blade 130a. In the connecting region between the two U-shaped bars of the second component of the first group 212, a hole is configured with its centerline aligned with the second axis of the first group 212a, used for the mechanical connection to the middle bar of the first component of the first group 211. According to various embodiments of the present invention, the second axis of the first group 212a is perpendicular to the central axis 200a.

The third component of the first group 213 is Y-shaped, which comprises a circular bar oriented in one direction, rigidly connected to a U-shaped bar with two ends oriented in the opposite direction. The circular bar of the third component of the first group 213 is mechanically connected to the center 200 through the first inclined hole, enabling the third component of the first group 213 to rotate to the center 200 around the fourth axis of the first group 214a. In this configuration, the U-shaped bar of the third component of the first group 213 is mechanically connected to the second component of the first group 212. More specifically, at each end of the U-shaped bar of the third component of the first group 213, a cylindrical pin is formed to hinge with the holes on the U-shaped bar with two ends towards the center 200 of the second component of the first group 212. As a result, the second component of the first group 212 and the third component of the first group 213 can rotate to each other around the third axis of the first group 213a.

Continuing with FIG. 4, the first component of the second group 221 comprises two aligned bars and one middle bar that are rigidly connected to form a "T" shape, mechanically connected to the center 200 through a hinge connection with the third support bar 203 and the fourth support bar 204 around the first axis of the second group 221a. According to various embodiments of the present invention, all three bars have circular cross-sections. Specifically, the two aligned bars of the first component of the second group 221 are connected to the holes in the third support bar 203 and the fourth support bar 204 but are limited at both ends. As a result, the first component of the second group 221 can rotate around the first axis of the second group 221a inside the holes but cannot translate along the holes.

The second component of the second group 222 comprises a U-shaped bar with two ends oriented towards the center 200, which is rigidly connected to another U-shaped bar with two ends oriented in the opposite direction. These bars are rigidly connected in the shape of a cross, with two branches of one U-shaped bar parallel and spaced 90° apart from two branches of the other. At each end oriented towards the center 200 of the second component of the second group 222, a hole is configured, with its centerline collinear with the third axis of the second group 223a, used for the mechanical connection to the third component of the second group 223. A hole is configured at each end facing away from the center 200 of the second component of the second group 222, used for the mechanical connection to the second propeller blade 130b. In the connecting region between the two U-shaped bars of the second component of the second group 222, a hole is configured with its centerline aligned with the second axis of the second group 222a, used for the mechanical connection to the middle bar of the first component of the second group 221.

According to various embodiments of the present invention, the second axis of the second group 222*a* is perpendicular to the central axis 200*a*. According to another embodiment of the present invention, the second axis of the second group 222*a* is further coplanar with the second axis of the first group 221*a*.

The third component of the second group 223 is Y-shaped, which comprises a circular bar oriented in one direction, rigidly connected to a U-shaped bar with two ends oriented in the opposite direction. The circular bar of the third component of the second group 223 is mechanically connected to the center 200 through the second inclined hole, enabling the third component of the second group 223 to rotate to the center 200 around the fourth axis of the second group 224*a*. In this configuration, the U-shaped bar of the third component of the second group 223 is mechanically connected to the second component of the second group 222. More specifically, at each end of the U-shaped bar of the third component of the second group 223, a cylindrical pin is formed to hinge with the holes on the U-shaped bar with two ends towards the center 200 of the second component of the second group 222. As a result, the second component of the second group 222 and the third component of the second group 223 can rotate to each other around the third axis of the second group 223*a*.

Figure 5:
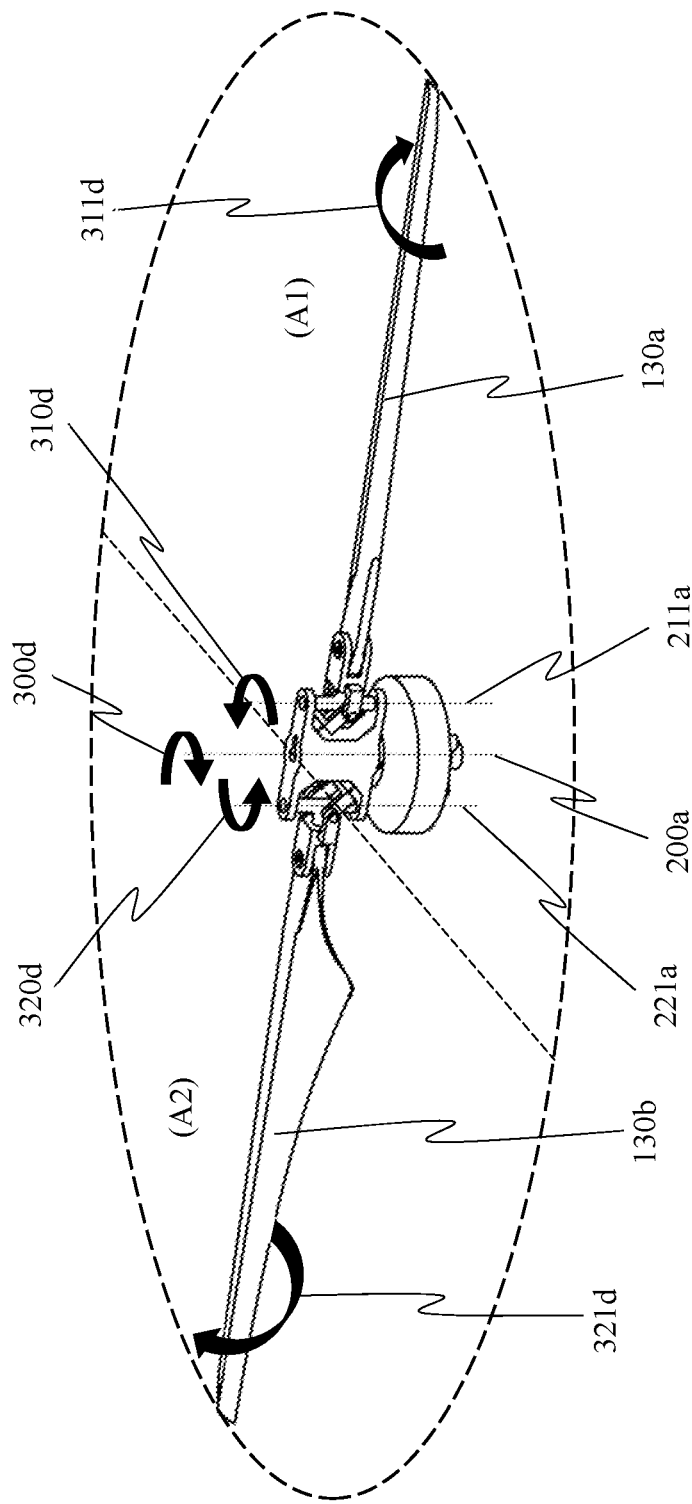
FIG. 5 is an illustration depicting the operating principle of the propeller control mechanism.

Thus, with the above structure, the first component of the first group 211, the second component of the first group 212, the third component of the first group 213, and the fourth component of the first group 214 all cooperate and operate together through the hinge axes, which are the first axis of the first group 211*a*, the second axis of the first group 212*a*, the third axis of the first group 213*a*, and the fourth axis of the first group 214*a*. Further referencing FIG. 5, when the rotor of motor 120 drives the center 200 to accelerate around the central axis 200*a* in the main rotary direction 300*d*, under the influence of inertial force, the first propeller blade 130*a* rotates to the center 200 in the first rotary direction 310*d*. At that time, the first propeller blade 130*a* tilts according to the first tilt direction 311*d*, increasing the angle of attack and thereby increasing the lifting force of the first propeller blade 130*a*. Conversely, when the center 200 is decelerated, the first propeller blade 130*a* rotates to the center 200 opposite the first rotary direction 310*d*. At that time, the first propeller blade 130*a* tilts opposite to the first tilt direction 311*d*, reducing the angle of attack and thereby decreasing the lifting force of the first propeller blade 130*a*.

Thus, with the above structure, the first component of the second group 221, the second component of the second group 222, the third component of the second group 223, and the fourth component of the second group 224 all cooperate and operate together through the hinge axes, which are the first axis of the second group 221*a*, the second axis of the second group 222*a*, the third axis of the second group 223*a*, and the fourth axis of the second group 224*a*. Further referencing FIG. 5, when the rotor of motor 120 drives the center 200 to accelerate around the central axis 200*a* in the main rotary direction 300*d*, under the influence of inertial force, the second propeller blade 130*b* rotates to the center 200 in the second rotary direction 320*d*. At that time, the second propeller blade 130*b* tilts according to the second tilt direction 321*d*, decreasing the angle of attack and thereby decreasing the lifting force of the second propeller blade 130*b*. Conversely, when the center 200 is decelerated, the second propeller blade 130*b* rotates to the center 200, opposite to the second rotary direction 320*d*. At that time, the second propeller blade 130*b* tilts opposite to the second tilt direction 321*d*, increasing the angle of attack and thereby increasing the lifting force of the second propeller blade 130*b*.

Figure 6:
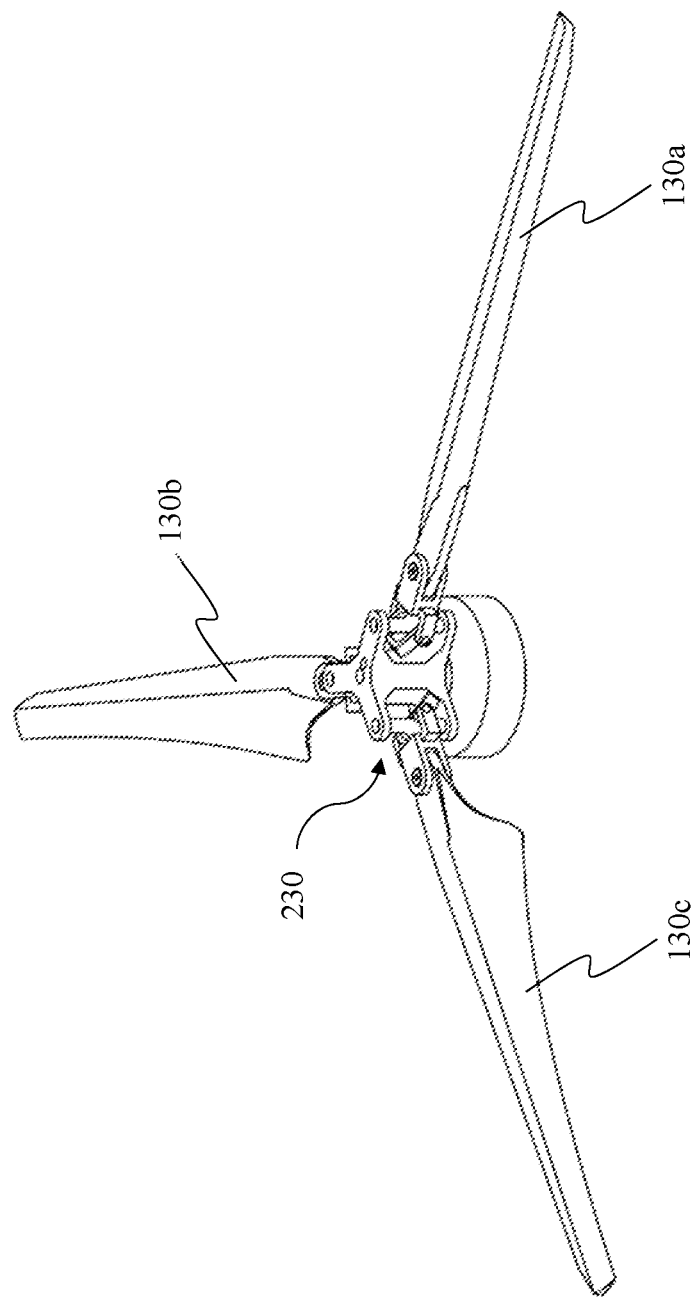
FIG. 6 is an exemplary illustration of a propeller system using the propeller control mechanism having three groups.

According to various embodiments of the present invention, further referencing FIG. 6, the propeller control mechanism 110 further comprises at least a third group 230 mechanically connected to the center 200, in which the mentioned third group 230 has a similar structure to the first group 210 or the second group 220, and the aforementioned third group 230 is mechanically connected to a third propeller blade 130*c*. In which the third group 230, the first group 210, and the second group 220 are evenly distributed around the center 200.

Thus, with the embodiments described in the present invention, vehicles equipped with the propeller control mechanism 110 can generate different lift forces on the propeller blades, which results in a useful attitude control moment. Specifically, referring to FIG. 5, when an operator wants a vehicle equipped with the propeller control mechanism 110 to tilt in a specific direction, assuming direction towards the area A2, then the lift force on the propeller blades in the area A1 needs to be greater than the lift force on the propeller blades in the opposite area A2. Therefore, while the first propeller blade 130*a* rotates in the area A1 trajectory, the center 200 is accelerated around the central axis 200*a* in the main rotary direction 300*d*. Under the influence of the inertial force, the first propeller blade 130*a* rotates to the center 200 in the first rotary direction 310*d*, tilting according to the first tilt direction 311*d*, increasing the angle of attack and the lift force of the first propeller blade 130*a*. At that time, in the respective area A2 trajectory, the second propeller blade 130*b* rotates to the center 200 in the second rotary direction 320*d*, tilting according to the second tilt direction 321*d*, reducing the angle of attack and the lift force of the second propeller blade 130*b*. Conversely, while the first propeller blade 130*a* rotates in the area A2 trajectory, the center 200 is decelerated around the central axis 200*a* in the main rotary direction 300*d*. Under the influence of the inertial force, the first propeller blade 130*a* rotates to the center 200 opposite to the first rotary direction 310*d*, tilting opposite to the first tilt direction 311*d*, reducing the angle of attack and the lift force of the first propeller blade 130*a*. At that time, in the respective area A1 trajectory, the second propeller blade 130*b* rotates to the center 200 opposite to the second rotary direction 320*d*, tilting opposite to the second tilt direction 321*d*, increasing the angle of attack and the lift force of the second propeller blade 130*b*. Therefore, a sinusoidal driving torque generated by the rotor of motor 120 in phase with the rotor rotation may cause each propeller blade to have an increased angle of attack as it rotates around area A1 on every revolution and a decreased angle of attack as it rotates around area A2 on every revolution. As a result, the average lift force in the area A1 is greater than the average lift force in the area A2, resulting in the useful attitude control moment and making the vehicle tilt towards the area A2. Therefore, under the alternating operation of deceleration and acceleration as described above, the attitude control of the vehicle can be achieved.

Implementations of the propeller control mechanism disclosed above achieve the following objectives:

The present invention provides a propeller control mechanism that serves as an intermediary, connecting the motor's rotor to the propeller blade. This mechanism enables control over the angle of attack on every revolution while maintaining a fixed angle between the propeller blade's feathering axis and the rotary axis of the propeller system. As a result, it optimizes the size of aerial vehicles, especially coaxial rotor vehicles.

Additionally, the propeller control mechanism also eliminates the need for multiple actuators, resulting in energy savings and extended operating time. Furthermore, this mechanism can be applied to vehicles operating on the surface of the water or underwater.

The terminology used herein is for the purpose of describing particular embodiments only and is not intended to be limiting to the invention. As used herein, the singular forms "a," "an," and "the" are intended to include the plural forms as well unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

These claims should be construed to maintain the proper protection for the invention first described. It will be understood that those skilled in the art, both now and in the future, may make various improvements and enhancements which fall within the scope of the claims which follow. These claims should be construed to maintain the proper protection for the invention first described.

DESCRIPTION OF NUMERALS

001 The range of motion of the rotor blades
002 The range of motion of the propeller blades
100 Propeller system
110 Propeller control mechanism
120 Rotor of motor
130a First propeller blade
130b Second propeller blade
130c Third propeller blade
140 Rotor position sensor
200 Center
200a Central axis
201 First support bar
202 Second support bar
203 Third support bar
204 Fourth support bar
210 First group
211 First component of the first group
211a First axis of the first group
212 Second component of the first group
212a Second axis of the first group
213 Third component of the first group
213a Third axis of the first group
214a Fourth axis of the first group
220 Second group
221 First component of the second group
221a First axis of the second group
222 Second component of the second group
222a Second axis of the second group
223 Third component of the second group
223a Third axis of the second group
224a Fourth axis of the second group
230 Third group
300d Main rotary direction
310d First rotary direction
311d First tilt direction
320d Second rotary direction
321d Second tilt direction

What is claimed is:

1. A propeller control mechanism comprising:
a center comprising a central axis, wherein the central axis serves as the center's rotary axis;
a first group mechanically connected to the center, comprising a first component of the first group, a second component of the first group, and a third component of the first group;
the first component of the first group is mechanically connected to the center, and is able to rotate relative to the center about a first axis of the first group;
the second component of the first group is mechanically connected to the first component of the first group, and is able to rotate relative to the first component of the first group about a second axis of the first group; and
one end of the third component of the first group is mechanically connected to the second component of the first group, and the second component is able to rotate relative to the third component of the first group about a third axis of the first group; another end of the third component of the first group is mechanically connected to the center, and is able to rotate relative to the center about a fourth axis of the first group;
wherein the first axis of the first group, the second axis of the first group, the third axis of the first group, and the fourth axis of the first group meet at a same point; and
a second group is mechanically connected to the center, the second group comprising a first component of the second group, a second component of the second group, and a third component of the second group;
the first component of the second group is mechanically connected to the center, and is able to rotate relative to the center about a first axis of the second group;
the second component of the second group is mechanically connected to the first component of the second group, and is able to rotate relative to the first component of the second group about a second axis of the second group; and
one end of the third component of the second group is mechanically connected to the second component of the second group, and the second component is able to rotate relative to the third component of the second group about a third axis of the second group; another end of the third component of the second group is mechanically connected to the center, and is able to rotate relative to the center about a fourth axis of the second group;
wherein the first axis of the second group, the second axis of the second group, the third axis of the second group, and the fourth axis of the second group meet at a same point.

2. The propeller control mechanism of claim 1, wherein the first axis of the first group is parallel to the first axis of the second group.

3. The propeller control mechanism of claim 2, wherein the first axis of the first group, the first axis of the second group, and the central axis are coplanar.

4. The propeller control mechanism of claim 1, wherein the second axis of the first group and the second axis of the second group are perpendicular to the central axis.

5. The propeller control mechanism of claim 4, wherein the second axis of the first group and the second axis of the second group are further in a same plane perpendicular to the central axis.

6. The propeller control mechanism of claim 1, wherein the fourth axis of the first group and the fourth axis of the second group are parallel.

7. The propeller control mechanism of claim 6, wherein the fourth axis of the first group, the fourth axis of the second group, and the central axis are coplanar.

8. The propeller control mechanism of claim 1, wherein:
the first axis of the first group, the second axis of the first group, and the third axis of the first group are mutually perpendicular to each other; and
the first axis of the second group, the second axis of the second group, and the third axis of the second group are mutually perpendicular to each other.

9. The propeller control mechanism of claim 8, wherein:
the fourth axis of the first group is coplanar with a plane containing the first axis of the first group and the second axis of the first group; and
the fourth axis of the second group is coplanar with a plane containing the first axis of the second group and the second axis of the second group.

10. The propeller control mechanism of claim 1, wherein:
the second component of the first group configured to mechanically connect to a first propeller blade;
the second component of the second group configured to mechanically connect to a second propeller blade;
the center is mechanically connected to a rotor of motor, which operates to provide control moments to the center.

11. The propeller control mechanism of claim 10, wherein the control moments are based on an estimate of a position of the rotor.

12. The propeller control mechanism of claim 11, wherein the estimate of the position of the rotor is based on direct measurement using a rotor position sensor.

13. The propeller control mechanism of claim 1, wherein the center comprises a first support bar, a second support bar, a third support bar, and a fourth support bar; wherein:
the center is mechanically connected to the first group through a hinge joint about the first axis of the first group, with one end of the first component of the first group located between ends of the first support bar and the second support bar; and
the center is mechanically connected to the second group through a hinge joint about the first axis of the second group, with one end of the first component of the second group located between ends of the third support bar and the fourth support bar.

* * * * *